US012249195B2

(12) United States Patent
Falcone et al.

(10) Patent No.: US 12,249,195 B2
(45) Date of Patent: Mar. 11, 2025

(54) DRIVE SYSTEM AND METHOD OF CONTROL

(71) Applicant: ArvinMeritor Technology, LLC, Troy, MI (US)

(72) Inventors: Frank J. Falcone, Escondido, CA (US); Ameya S. Jathar, Escondido, CA (US)

(73) Assignee: ArvinMeritor Technology, LLC

( * ) Notice: Subject to any disclaimer, the term of this patent is extended or adjusted under 35 U.S.C. 154(b) by 240 days.

(21) Appl. No.: 17/949,593

(22) Filed: Sep. 21, 2022

(65) Prior Publication Data

US 2024/0096144 A1 Mar. 21, 2024

(51) Int. Cl.
*G07C 5/08* (2006.01)
*B60L 3/00* (2019.01)
*B60L 15/20* (2006.01)

(52) U.S. Cl.
CPC .......... *G07C 5/0808* (2013.01); *B60L 3/0084* (2013.01); *B60L 15/20* (2013.01); *B60L 2250/28* (2013.01)

(58) Field of Classification Search
CPC ..... G07C 5/0808; B60L 3/0084; B60L 15/20; B60L 2250/28; B60L 2240/423; B60W 2050/0026; B60W 2050/0052; B60W 2540/106; B60W 10/08; B60W 2300/12; B60W 2510/083; B60W 2710/083
USPC .......................................................... 701/22
See application file for complete search history.

(56) References Cited

U.S. PATENT DOCUMENTS

| 5,475,289 | A | * | 12/1995 | McLaughlin | ............. H02P 6/28 388/930 |
| 5,743,351 | A | * | 4/1998 | McLaughlin | ........ B62D 5/0463 701/41 |
| 6,122,579 | A | * | 9/2000 | Collier-Hallman | ......................... B62D 5/0472 318/432 |
| 9,987,916 | B2 | | 6/2018 | Cho | |
| 10,889,205 | B2 | | 1/2021 | Hettrich et al. | |
| 10,989,288 | B1 | | 4/2021 | Ghatti et al. | |
| 11,002,352 | B2 | | 5/2021 | Ghatti et al. | |
| 11,038,396 | B2 | | 6/2021 | Raya et al. | |
| 11,207,976 | B2 | | 12/2021 | Ghatti et al. | |
| 11,209,072 | B2 | | 12/2021 | Ghatti et al. | |
| 11,220,176 | B1 | | 1/2022 | Cradit et al. | |
| 2003/0014167 | A1 | * | 1/2003 | Pedersen | ................. F16F 15/00 701/41 |

(Continued)

FOREIGN PATENT DOCUMENTS

| CN | 113276689 | * | 8/2021 |
| CN | 113276689 | A | 8/2021 |
| GB | 2594292 | A | 10/2021 |

OTHER PUBLICATIONS

Extended European Search Report dated Feb. 15, 2024, for European Application No. 23197257.1; 9 pages.

(Continued)

*Primary Examiner* — Muhammad Shafi
(74) *Attorney, Agent, or Firm* — Brooks Kushman PC

(57) ABSTRACT

A drive system and method of control. The method includes reducing damping of a damped torque command signal when an error between a torque command signal and the damped torque command signal exceeds a threshold amount. Torque is provided with a torque source of the drive system based on the damped torque command signal.

20 Claims, 2 Drawing Sheets

(56) References Cited

U.S. PATENT DOCUMENTS

| | | | |
|---|---|---|---|
| 2008/0116832 A1 | 5/2008 | Yamada et al. | |
| 2011/0213527 A1* | 9/2011 | Itabashi | B60W 10/11 |
| | | | 701/37 |
| 2014/0277875 A1* | 9/2014 | Liang | B60K 6/445 |
| | | | 903/930 |
| 2015/0123624 A1* | 5/2015 | Ookawa | B60W 10/26 |
| | | | 322/22 |
| 2016/0052422 A1* | 2/2016 | Hashimoto | B60L 15/2045 |
| | | | 903/902 |
| 2021/0291646 A1 | 9/2021 | Lorenz et al. | |
| 2021/0324837 A1* | 10/2021 | Abers | F03G 7/125 |

OTHER PUBLICATIONS

Cradit et al., U.S. Appl. No. 17/308,307, filed May 5, 2021, 46 pages.

\* cited by examiner

DRIVE SYSTEM AND METHOD OF CONTROL

TECHNICAL FIELD

This relates to a drive system and method of control.

BACKGROUND

An apparatus and method for controlling a motor to reduce vibration of electric vehicle is disclosed in U.S. Pat. No. 9,987,916.

SUMMARY

In at least one configuration and method of controlling a drive system of a vehicle is provided. The method includes determining an error between a torque command signal and a damped torque command signal. The error is determined by comparing the torque command signal to the damped torque command signal. The method includes determining whether the error exceeds a threshold amount. Damping of the damped torque command signal is reduced when the error exceeds the threshold amount. Torque is provided with a torque source of the drive system based on the damped torque command signal.

The torque command signal may be based on a position of an accelerator pedal.

Comparing the torque command signal to the damped torque command signal may include subtracting the damped torque command signal from the torque command signal.

The threshold amount may be based on a resonant frequency of the vehicle. The damped torque command signal may be based on the torque command signal. The damped torque command signal may be determined by filtering the torque command signal.

The damped torque command signal may be filtered with data from a torque request up lookup table. The damped torque command signal may be filtered with data from a torque request down lookup table. The damped torque command signal may be determined by filtering the torque command signal using data from the torque request up lookup table and data from the torque request down lookup table. The torque request up lookup table may control the rate at which damping of the torque command signal increases. The torque request down lookup table may control the rate at which damping of the torque command signal decreases. Filtering the torque command signal with the torque request up lookup table and the torque request down lookup table may include selecting a value from the torque request up lookup table based on the error and selecting a value from the torque request down lookup table based on the error.

Reducing damping of the damped torque command signal when the error exceeds the threshold amount may include reducing damping of the damped torque command signal in proportion to the error.

Reducing damping of the damped torque command signal may include progressively decreasing the damping when the torque command signal is indicative of a request for acceleration. Providing torque with the torque source based on the damped torque command signal may include increasing torque provided with the torque source along a continuous curve when the error exceeds the threshold amount and the torque command signal is indicative of a request for acceleration.

Reducing damping of the damped torque command signal may include progressively decreasing the damping when the torque command signal is indicative of a request for deceleration. Providing torque with the torque source based on the damped torque command signal may include decreasing torque provided with the torque source along a continuous curve when the error exceeds the threshold amount and the torque command signal is indicative of a request for deceleration.

The method may include not reducing damping of the damped torque command signal when the error does not exceed the threshold amount. The threshold amount may be a constant.

In at least one embodiment a drive system is provided. The drive system includes a torque source, an accelerator pedal, an accelerator pedal position sensor, and a controller. The torque source is configured to provide torque to a vehicle wheel. The accelerator pedal position sensor provides a torque command signal based on a position of the accelerator pedal. The controller controls torque that is provided with the torque source based on a damped torque command signal. The controller is configured to reduce damping of the damped torque command signal when an error between the torque command signal in the damped torque command signal exceeds a threshold amount.

The controller may not reduce damping of the damped torque command signal when the error does not exceed the threshold amount.

The accelerator pedal may be actuated by foot of a driver. Not reducing damping of the damped torque command signal may filter vibration of the foot.

The torque source may be an electric motor. Torque may be provided by the electric motor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
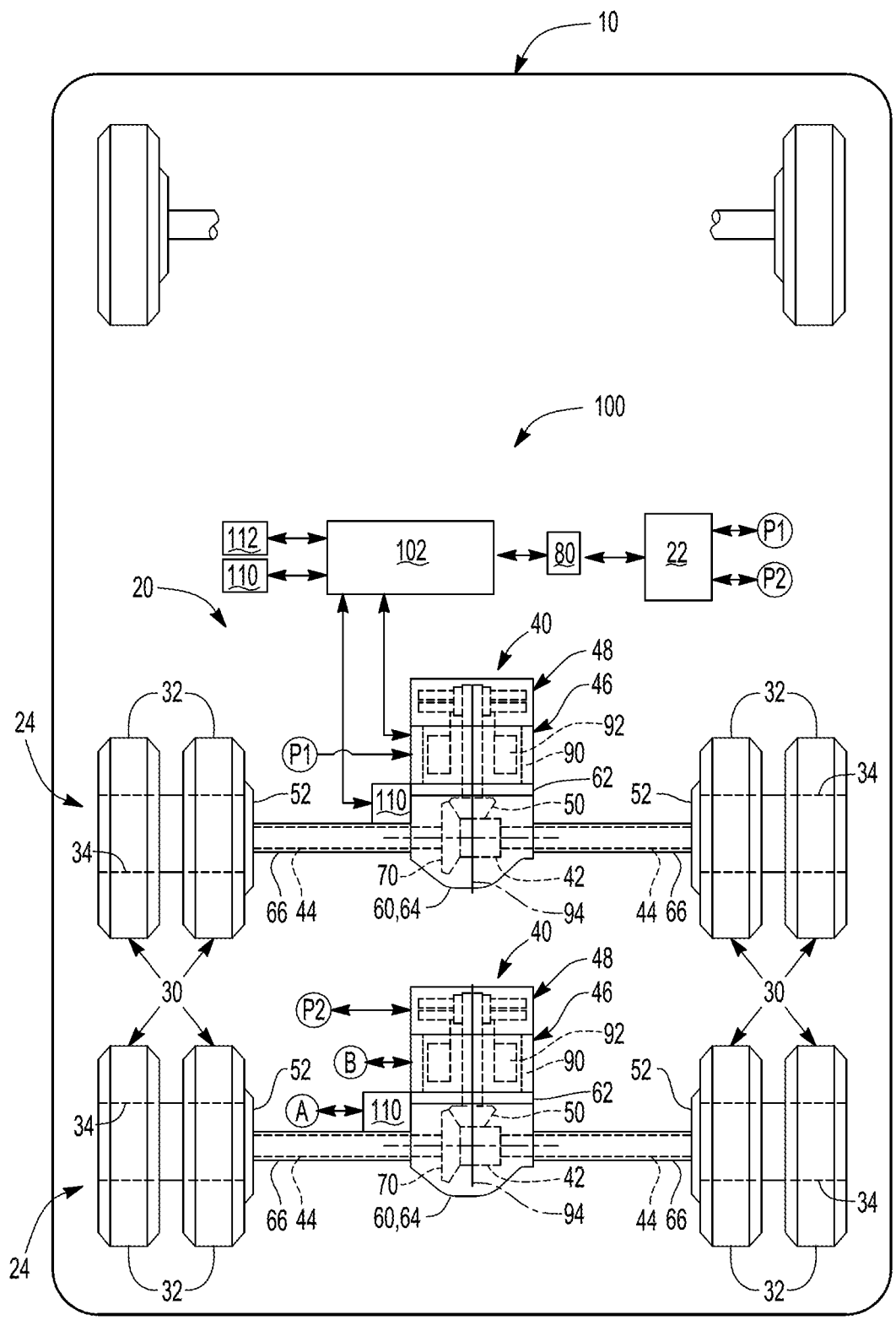
FIG. 1 is a schematic representation of an example of a vehicle that has a drive system.

Referring to FIG. 1, an example of a vehicle 10 is shown. The vehicle 10 may be of any suitable type. For instance, the vehicle 10 may be a land vehicle like a truck, bus, farm equipment, mining equipment, military transport or weaponry vehicle, or cargo loading equipment for land, air, or marine vessels. The vehicle 10 may include a trailer for transporting cargo. In at least one configuration, the vehicle 10 includes a drive system 20 and at least one power source 22 that may be provided with or may be operatively connected to at least one axle assembly 24.

The power source 22 may have any suitable configuration. For instance, a power source 22 may be an electrical power source, such as a battery, capacitor, or fuel cell, or a non-electrical power source, such as an internal combustion engine. Electrical and non-electrical power sources may be provided with the vehicle 10 provide a hybrid drivetrain. The drive system 20 and the method of control will be primarily described in the context of a power source 22 that is configured as an electrical power source.

The drive system 20 includes one or more axle assemblies 24, such as a front axle assembly and a rear axle assembly. The axle assemblies 24 are illustrated as drive axle assemblies. A drive axle assembly is configured to provide torque to one or more wheel assemblies 30 that may be rotatably supported on the axle assembly 24. A wheel assembly 30 may include a tire 32 disposed on a wheel 34.

The axle assemblies 24 may have similar or identical configurations. In the configuration shown, both axle assemblies 24 are illustrated with configurations that are suitable for an electric vehicle and include a housing assembly 40, a differential assembly 42, a pair of axle shafts 44, a torque source 46, a transmission 48, and a drive pinion 50. In addition, a friction brake may be associated with each wheel assembly 30. The positioning of the differential assembly 42, the torque source 46, and/or the transmission 48 may differ from that shown. For instance, the differential assembly 42 may be positioned between the torque source 46 and the transmission 48.

The housing assembly 40 receives various components of the axle assembly 24. In addition, the housing assembly 40 may facilitate mounting of the axle assembly 24 to the vehicle 10. In at least one configuration, the housing assembly 40 may include an axle housing 60 and a differential carrier 62.

The axle housing 60 receives and supports the axle shafts 44. In at least one configuration, the axle housing 60 may include a center portion 64 and at least one arm portion 66.

The center portion 64 may be disposed proximate the center of the axle housing 60. The center portion 64 may define a cavity that may receive the differential assembly 42.

One or more arm portions 66 may extend from the center portion 64. For example, two arm portions 66 may extend in opposite directions from the center portion 64 and away from the differential assembly 42. The arm portions 66 may each have a hollow configuration or tubular configuration that may extend around and may receive a corresponding axle shaft 44 and may help separate or isolate the axle shaft 44 from the surrounding environment. A wheel hub may be rotatably disposed on an arm portion 66 and operatively connected to an axle shaft 44. A wheel assembly 30 is mountable to the wheel hub.

The differential carrier 62 may be mounted to the center portion 64 of the axle housing 60. The differential assembly 42 may be rotatably supported on the differential carrier 62.

The differential assembly 42 is disposed in the housing assembly 40. For instance, the differential assembly 42 may be disposed in the center portion 64 of the axle housing 60. The differential assembly 42 may transmit torque to the axle shafts 44 of the axle assembly 24 and permit the axle shafts 44 and wheel assemblies 30 to rotate at different velocities in a manner known by those skilled in the art. For example, the differential assembly 42 may have a ring gear 70 that may be fixedly mounted on a differential case. The ring gear 70 and the differential case may be rotatable about a differential axis. The differential case may receive differential gears that may be operatively connected to the axle shafts 44.

The axle shafts 44 are configured to transmit torque between the differential assembly 42 and a corresponding wheel hub. For example, two axle shafts 44 may be provided such that each axle shaft 44 extends through a different arm portion 66 of axle housing 60. The axle shafts 44 may be rotatable about an axis, such as a wheel axis or the differential axis.

One or more torque sources 46 may be provided with the vehicle 10. A torque source 46 may have any suitable configuration. For instance, a torque source 46 may be an electrical machine, such as an electric motor in a vehicle having an electric or hybrid electric configuration. A torque source 46 may be an internal combustion engine, such as in a vehicle having a hybrid electric configuration, a hydraulic motor, or the like. A torque source 46 that is configured as an electrical machine may be electrically connected to a power source 22, such as a battery, capacitor, fuel cell, or combinations thereof.

The torque source 46 is configured to provide torque. For instance, a torque source 46 that is configured as an electrical machine may provide propulsion torque or regenerative braking torque. Propulsion torque may be used to propel the vehicle 10, such as in a forward or backward direction. Propulsion torque may also be used to hold the vehicle 10 in a stationary position or to help reduce, limit, or prevent vehicle rollback, such as when the vehicle 10 is on an inclined surface. Regenerative braking may provide a regenerative braking torque, which may also be referred to as regenerative brake torque or regenerative torque. Regenerative braking may capture kinetic energy when the torque source 46 is used to brake or slow the velocity of the vehicle 10. Recovered energy may be transmitted from the wheel assemblies 30 to drive the torque source 46. Thus, the torque source 46 may function as a generator and may be used to charge an electric power source. The torque source 46 may be electrically connected to the electric power source via an inverter 80 in a manner known by those skilled in the art. The torque source 46 may be mounted to the axle assembly 24 or may be remotely positioned from the axle assembly 24.

Examples of electrical connections between the front axle assembly 24 and the like a power source and between the rear axle assembly 24 and the electric power source 22 are represented with connection symbols P1 and P2, respectively. In the configuration shown, the electric power source 22 is electrically connected to both axle assemblies 24; however, it is contemplated that each axle assembly 24 may be electrically connected to a different electric power source or different electric power sources. For instance, a first electric power source may be electrically connected to a first axle assembly but not to a second axle assembly while a second electric power source may be electrically connected to the second axle assembly but not to the first axle assembly.

The torque source 46 may be mounted to or positioned inside of the housing assembly 40. The torque source 46 may include a stator 90 and a rotor 92 when configured as an electrical machine. The stator 90 may be fixedly positioned with respect to the housing assembly 40. The stator 90 may encircle the rotor 92. The rotor 92 is rotatable about an axis 94 with respect to the stator 90. It is also contemplated that the torque source 46 may be located remotely from the axle assembly 24 and thus may not be mounted to or positioned in the housing assembly 40.

The transmission 48 facilitates the transmission of torque between the torque source 46 and the drive pinion 50. Torque transmission may be bidirectional. The transmission 48 may provide gear reduction and multiple gear ratios between the rotor 92 and the drive pinion 50. The transmission 48 may be of any suitable type. For instance, the transmission 48 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. No. 11,038,396 and U.S. patent application Ser. No. 17/308,307. The disclosures of the references in the preceding three sentences are hereby incorporated in their entirety by reference herein.

The drive pinion 50 operatively connects the differential assembly 42 and the transmission 48. The drive pinion 50 may be received in the housing assembly 40 and may transmit torque between the differential assembly 42 and the transmission 48. The drive pinion 50 may be rotatable about an axis, such as the axis 94, and may have a gear portion that has teeth that meshes with teeth of the ring gear 70 of the differential assembly 42. Torque that is provided by the torque source 46 to the transmission 48 and to the drive pinion 50 may be transmitted to the ring gear 70 and thus to the differential assembly 42.

A control system 100 controls operation of the drive system 20. For example, the control system 100 may include one or more microprocessor-based control modules or controllers 102 that may be electrically connected to or communicate with components of the vehicle 10 and/or the axle assembly 24, such as the torque source 46, the inverter 80, etc. Control system connections are represented by the double arrowed lines associated with the controller 102 in FIG. 1. A double-arrowed line between the controller 102 and the rear axle assembly 24 is omitted for clarity. The control system 100 may also monitor and control the power source 22. In addition, the control system 100 may also process input signals or data from various input devices or sensors, such as an accelerator pedal position sensor 110.

The accelerator pedal position sensor 110 provides a signal that is indicative of the position of an accelerator pedal 112. For example, the accelerator pedal position sensor 110 may provide a signal that is indicative of a request for acceleration the vehicle 10. The signal provided by the accelerator pedal position sensor 110 is referred to as a torque command signal and may be used by the controller 102 to control the torque that is provided by a torque source, such as the torque source 46. For instance, the controller 102 may control the torque source 46 to provide propulsion torque or regeneration torque based on the signal from the accelerator pedal position sensor 110.

The accelerator pedal 112 may be operated or actuated by a driver or operator of the vehicle 10 to request acceleration and deceleration of the vehicle 10. The accelerator pedal 112 may have any suitable configuration. For example, the accelerator pedal 112 may be a foot-operated pedal that may be mounted near the floor of the passenger compartment of the vehicle 10 or may be a hand-operated pedal that may be provided in another location, such as proximate a steering wheel or control console of the vehicle 10. The accelerator pedal 112 will primarily be discussed in the context of a foot-operated pedal that is actuated by the foot of a driver of the vehicle 10.

The accelerator pedal 112 may be moveable between a first position and a second position. The first position may be a released position in which the accelerator pedal 112 is not actuated or depressed by the driver. The first position may correspond with a 0% pedal position when expressed as a percentage. The second position may be a fully actuated or "full throttle" position in which the accelerator pedal 112 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage. It is also contemplated that autonomous driving system or cruise control system may provide a signal that is indicative of a request for acceleration of the vehicle 10 and thus function as an accelerator pedal. Accordingly, the term accelerator pedal as used herein also encompasses such systems.

It is also contemplated that a single pedal may provide a signal or signals indicative of a request for acceleration or a request for deceleration rather than separate accelerator and brake pedals. Such a configuration in referred to as a "one-pedal" driving system. Thus, the term accelerator pedal also encompasses one-pedal driving system in which a single pedal can be used to request acceleration and deceleration of the vehicle.

Figure 2:
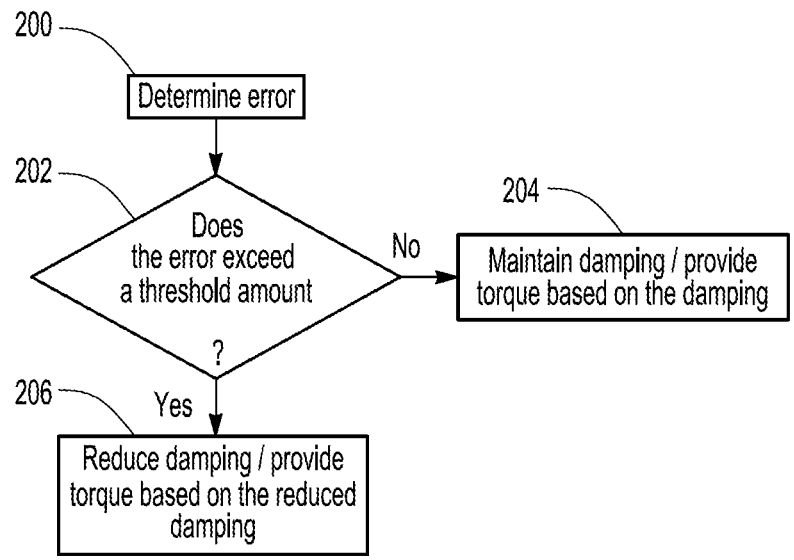
FIG. 2 is a flowchart of a method of control.

Referring to FIG. 2, a flowchart of a method of controlling an axle assembly is shown. As will be appreciated by one of ordinary skill in the art, the flowchart may represent control logic that may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 100 and may be implemented as a closed loop control system.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As an overview, vehicle vibrations and terrain-induced movement or shaking of the vehicle can be transmitted to the driver of the vehicle. This in turn can cause the driver to unintentional actuate the accelerator pedal 112. For instance, vehicle vibrations or terrain-induced movement can cause the foot of the driver to bounce or move unintentionally. This unintentional foot movement can be transmitted to the accelerator pedal, thereby unintentionally actuating the accelerator pedal. Providing torque in response to unintentional pedal actuation can cause the vehicle drivetrain to surge when the accelerator pedal is depressed from its desired or intended position, thereby resulting in undesired speed changes and jerky drivetrain responsiveness rather than smooth acceleration and deceleration. Such responsiveness may be more pronounced in a vehicle that utilizes an electric motor to provide torque as compared to a vehicle that utilizes an internal combustion engine since torque may be provided more rapidly or at a faster rate with an electric motor.

Filtering a signal indicative of the position of the accelerator pedal using a typical filter, such as a band pass filter or averaging filter, may provide inappropriate or insufficient responsiveness in response to unintended accelerator pedal actuation. For instance, an averaging filter may provide slow responsiveness when the averaging filter is based on a large number of data points or a long period of time. More specifically, the accelerator pedal may need to be actuated for a relatively long period of time to have an effect on the average, which results in a noticeable lag in drivetrain responsiveness when vehicle acceleration or deceleration is intentionally requested by the driver. Using in averaging filter based on a small number of data points may result in a faster response but may lack smooth acceleration and deceleration.

The present invention uses an error-based filter that better distinguishes between unintended accelerator pedal actuation and intentional accelerator pedal actuation. The filter may be calibrated to provide damping under predetermined conditions, such as conditions associated with the vehicle resonance frequency or conditions in which the vehicle driver is more likely to be vibrated and unintentionally actuate the accelerator pedal. Damping may be reduced when the torque command signal associated with the accelerator pedal position differs greatly from a damped torque command signal. Thus, rapid changes in the position of the accelerator pedal position or larger magnitude changes in the accelerator pedal position may be identified as an intentional driver input and may be responded to more promptly and with smoother torque application.

At block 200, the error between the torque command signal and a damped torque command signal may be determined. This is best understood with reference to FIG. 3.

The torque command signal is based on the signal that is output from the accelerator pedal position sensor 110 and is represented by the arrowed lines extending from the accelerator pedal position sensor 110. For convenience in reference, the torque command signal is designated D. The torque command signal may be indicative of the current position or detected position of the accelerator pedal 112.

Figure 3:
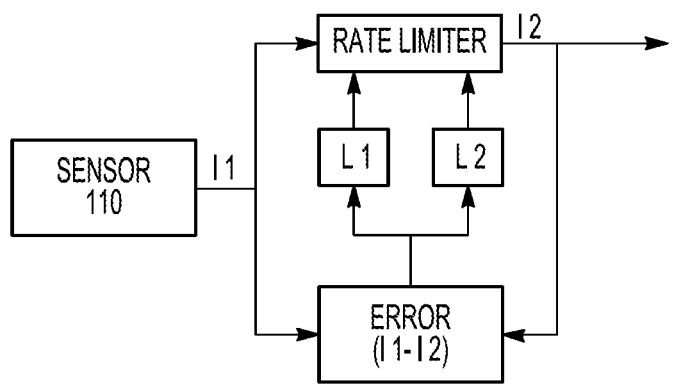
FIG. 3 is a control flow schematic associated with the method.

The damped torque command signal may be based on the output of a dynamic rate limiter, which is designated with the label "Rate Limiter" in FIG. 3. For instance, the dynamic rate limiter may dampen or limit the rate of change of the torque command signal. The damped signal is called a damped torque command signal and may be the output of the dynamic rate limiter. The damped torque command signal is represented by the arrowed line exiting the rate limiter. For convenience in reference, the damped torque command signal is designated 12. The damped torque command signal may be used to control the torque provided by the axle assembly 24 as will be discussed in more detail below.

The damped torque command signal may be determined by filtering the torque command signal with data from two lookup tables. These lookup tables are designated as a torque request up lookup table L1 and a torque request down lookup table L2 in FIG. 3. The torque request up lookup table L1 may control the rate at which damping of the torque command signal increases. The torque request down lookup table L2 may control the rate at which damping of the torque command signal decreases. The lookup tables may be populated based on vehicle development testing. Vehicle development testing may be used to determine the resonant frequency of the vehicle. For instance, the vehicle may resonate at or around a predetermined frequency which may be determined by simulations or data acquisition by instrument in the vehicle and driving the vehicle along a test track or vehicle proving ground. Optionally, lookup table values may be calibrated to help provide damping when resonance or vibration is more likely to occur.

The error is based on the difference between the damped torque command signal and the torque command signal. For instance, the damped torque command signal may be subtracted from the torque command signal to determine the error (e.g., error=torque command signal−damped torque command signal=I1−I2).

The error may be used as an input to the torque request up lookup table and the torque request down lookup table. A preset error value or a unit delay may be provided at vehicle startup to ignore the first few initial error value calculations and to ensure that an error value is present to reference the lookup tables and provide inputs to the dynamic rate limiter. Unintentional changes in the position of the foot of the driver are unlikely to occur at startup or near startup and thus ignoring the initial error values may not have a meaningful effect on the damped torque command signal output by the rate limiter. It is also contemplated that a default error value may be initially used that sets the error at or near zero.

At block 202, the method determines whether the error exceeds a threshold amount. The threshold amount may be a variable amount or a constant amount. As a nonlimiting example, the threshold amount may be a constant, such as 20% when expressed as a percentage. The threshold amount may be determined based on vehicle development testing.

For instance, the threshold amount may be set to accommodate the resonant frequency of the vehicle, such as by setting the threshold amount at a sufficiently high value to provide damping when the foot of the vehicle driver unintentionally oscillates and the vehicle is vibrating at or near its resonant frequency. Larger unintentional pedal oscillations may occur when the vehicle is at or near its resonant frequency. Thus, the threshold amount may be set so that the magnitude of unintentional driver induced oscillations are less than the threshold amount when large magnitude oscillations are expected to occur, thereby helping distinguish unintentional pedal movement from intentional pedal actuation. The magnitude of the error may be considered to be small when the error does not exceed the threshold amount. The magnitude of the error may be considered to be large when the error exceeds the threshold amount. If the error does not exceed the threshold amount, then the method continues at block 204. If the error exceeds the threshold amount, then the method continues at block 206.

At block 204, the level of damping is maintained. Block 204 is reached when the magnitude of the error is considered to be small. The error may be small when there is no change in the position of the accelerator pedal 112 or when the position of the accelerator pedal 112 changes by a small amount that may be indicative of unintentional movement of the foot of the driver. As a result, damping of the torque command signal may be maintained since the torque command signal is considered to most likely be partially or completely due to unintended vibration or movement of the foot of the driver. Maintaining damping of the torque command signal may or may not result in a change in the damped torque command signal that is output by the dynamic rate limiter from iteration to iteration. The damping provided by the dynamic rate limiter limits the rate of change of the damped torque command signal so that the damped torque command signal may gradually increase or decrease. As such, the variable rate limiter may limit the first derivative of the torque command signal and the amount of damping may change in proportion to the error (e.g., small difference between the torque request signal and the damped torque request signal=small error=small damping change). Moreover, the damped torque command signal may change no faster than a specified limit.

The damped torque command signal may be used to control or command the amount of torque that is provided by the torque source. For instance, in an electric vehicle configuration, the damped torque command signal may be used to control the torque provided by the torque source 46 and thus control the torque that is provided to the wheel assemblies 30 of the axle assembly 24. Block 204 may represent the end of an iteration of the method. Accordingly, the method may repeat by returning to block 200 to determine whether the error has changed and to conduct a subsequent iteration of the method.

At block 206, the level of damping is reduced. Block 206 is reached when the magnitude of the error is considered to be large. The error may be large when there is a change in the position of the accelerator pedal 112 that is sufficiently large to be considered to be due to intentional movement of the foot of the driver. In response, damping of the torque command signal is reduced. Damping of the torque command signal may be reduced at a rate that is proportional to the error. For example, the error increases as the rate of change in the position of the accelerator pedal 112 increases. Larger errors may be associated with values in the lookup tables that produce a more rapid change in acceleration or deceleration as compared to smaller errors.

The lookup table values may be configured to provide a smooth change in acceleration or deceleration. As an illustrative example, a change in the position of the accelerator pedal 112 from a 10% actuation position to a 60% actuation position may be considered to be a large error that exceeds the threshold amount, such as a threshold amount of 20% used as an example above. Thus, the change from the 10% actuation position to the 60% actuation position is indicative of an intentional request for acceleration. In response, the damping provided by the dynamic rate limiter may be progressively decreased, such as along a continuous curve. Progressively decreasing the damping in response to an acceleration request allows the damped torque command signal to be changed more rapidly to better match the torque command signal, thereby resulting in increased acceleration. Decreasing the damping along a continuous curve or no faster than a specified limit may provide a smooth increase in acceleration that is not discomforting to the vehicle driver.

If the driver held the accelerator pedal 112 at the 60% position after reaching a desired speed (i.e., after the requested acceleration has been provided) and there was little change in the position of the accelerator pedal 112, then vibration-induced foot movement and the resulting pedal movement would result in a small error and the amount of damping provided by the dynamic rate limiter would be maintained at a sufficiently high level to reduce the rate of change in the damped torque command signal and thus limit the rate of change of the damped torque command signal to a greater degree than when the large error was detected.

Continuing the example, if the driver then subsequently lifted off the accelerator pedal, thereby causing the accelerator pedal to move rapidly to the 0% actuation position, then this again would be considered a large error and be indicative of a request for deceleration. In response, the damping provided by the dynamic rate limiter would be progressively decreased, such as along a continuous curve. Progressively decreasing the damping in response to a deceleration request allows the damped torque command signal to be changed more rapidly, thereby resulting in increased deceleration. Deceleration may be provided by operating the torque source 46 as a generator based on the damped torque command signal. Decreasing and the damping along a continuous curve may provide a smooth increase in deceleration that is not discomforting to the vehicle driver.

A system and method as described above may allow a torque command signal to be damped more intelligently so that unintended pedal actuations are damped more than intentional pedal actuations, thereby better matching the torque requested by the driver to the torque that is provided to the vehicle wheels. As a result, unintentional vehicle-induced or driver-induced oscillations associated with changes in the position of the foot of the driver can be damped to avoid rapid increases or decreases in the torque provided by the torque source. In addition, the present invention may better distinguish unintentional pedal actuations from intentional pedal actuations by controlling damping based on error rather than by using conventional filters that filter at a fixed rate, for a fixed time, or over a set frequency. As such, the present invention may reduce damping when the driver demands the rapid addition or reduction of torque, thereby improving acceleration and deceleration responsiveness in real-time. Damping may be based on the resonant frequency of the vehicle or attenuated so that damping is provided when vehicle and driver foot vibrations are more likely to occur.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a drive system of a vehicle, the method comprising:
    determining, with a controller of the drive system, an error between a torque command signal and a damped torque command signal by comparing the torque command signal to the damped torque command signal;
    determining, with the controller, whether the error exceeds a threshold amount;
    reducing, with the controller, damping of the damped torque command signal when the error exceeds the threshold amount; and
    providing torque with a torque source of the drive system based on the damped torque command signal.

2. The method of claim 1 wherein the torque command signal is based on a position of an accelerator pedal.

3. The method of claim 1 wherein comparing the torque command signal to the damped torque command signal includes subtracting the damped torque command signal from the torque command signal.

4. The method of claim 1 wherein the threshold amount is based on a resonant frequency of the vehicle.

5. The method of claim 1 wherein the damped torque command signal is based on the torque command signal.

6. The method of claim 1 wherein the damped torque command signal is determined by filtering the torque command signal using data from a torque request up lookup table and data from a torque request down lookup table.

7. The method of claim 6 wherein the torque request up lookup table controls a rate at which damping of the torque command signal increases.

8. The method of claim 6 wherein the torque request down lookup table controls a rate at which damping of the torque command signal decreases.

9. The method of claim 6 wherein filtering the torque command signal with the torque request up lookup table and the torque request down lookup table includes selecting a value from the torque request up lookup table based on the error and selecting a value from the torque request down lookup table based on the error.

10. The method of claim 1 wherein the threshold amount is a constant.

11. The method of claim 1 wherein reducing damping of the damped torque command signal when the error exceeds the threshold amount includes reducing damping of the damped torque command signal in proportion to the error.

12. The method of claim 1 wherein reducing damping of the damped torque command signal when the error exceeds the threshold amount includes progressively decreasing the damping when the torque command signal is indicative of a request for acceleration.

13. The method of claim 12 wherein providing torque with the torque source based on the damped torque command signal includes increasing torque provided with the torque source along a continuous curve.

14. The method of claim 1 wherein reducing damping of the damped torque command signal when the error exceeds the threshold amount includes progressively increasing the damping when the torque command signal is indicative of a request for deceleration.

15. The method of claim 14 wherein providing torque with the torque source based on the damped torque command signal includes decreasing torque provided with the torque source along a continuous curve.

16. The method of claim 1 further comprising not reducing damping of the damped torque command signal when the error does not exceed the threshold amount.

17. A drive system comprising:
    a torque source that is configured to provide torque to a vehicle wheel;
    an accelerator pedal;
    an accelerator pedal position sensor that provides a torque command signal based on a position of the accelerator pedal; and
    a controller that controls torque provided with the torque source based on a damped torque command signal, wherein the controller is configured to reduce damping of the damped torque command signal when an error between the torque command signal and the damped torque command signal exceeds a threshold amount.

18. The drive system of claim 17 wherein the controller does not reduce damping of the damped torque command signal when the error does not exceed the threshold amount.

19. The drive system of claim 18 wherein the accelerator pedal is actuated by a foot of a driver and not reducing damping of the damped torque command signal filters vibration of the foot.

20. The drive system of claim 17 wherein the torque source includes an electric motor and torque is provided by the electric motor.

* * * * *